United States Patent
Nix

(12) 
(10) Patent No.: US 6,199,826 B1
(45) Date of Patent: Mar. 13, 2001

(54) JACK DOLLY

(76) Inventor: Ronald Scott Nix, 1821 Boston, Longmont, CO (US) 80501

( * ) Notice: Subject to any disclaimer, the term of this patent is extended or adjusted under 35 U.S.C. 154(b) by 0 days.

(21) Appl. No.: 09/414,380

(22) Filed: Oct. 7, 1999

(51) Int. Cl.[7] ..................................................... B60P 1/48
(52) U.S. Cl. ..................... 254/8 B; 254/1; 254/DIG. 1; 254/DIG. 4; 254/133; 254/134
(58) Field of Search .............................. 280/62; 254/2 B, 254/3 B, 4 B, 5 B, 6 B, 7 B, 8 B, 9 B, 10 B, DIG. 1, DIG. 4, 133, 134, 100, 1

(56) References Cited

U.S. PATENT DOCUMENTS

| | | | |
|---|---|---|---|
| 469,507 | * 2/1892 | Spencer | 280/62 |
| 973,690 | * 10/1910 | Norwood | 254/2 B |
| 1,569,589 | * 1/1926 | Stocker | 254/2 B |
| 1,666,139 | * 4/1928 | Johnson | 280/62 |
| 2,023,410 | 12/1935 | Davis et al. . | |
| 2,204,110 | * 6/1940 | Toop | 280/62 |
| 2,314,129 | * 3/1943 | Daley | 280/62 |
| 2,429,723 | 10/1947 | Kelley . | |
| 2,489,056 | 11/1949 | Stewart . | |
| 2,552,804 | * 5/1951 | Morris | 280/62 |
| 2,577,416 | * 12/1951 | Geisse | 280/62 |
| 2,627,425 | * 2/1953 | McNamara | 280/62 |
| 2,636,715 | * 4/1953 | Griffin | 254/2 B |
| 2,655,412 | * 10/1953 | Jones | 254/2 B |
| 4,043,536 | 8/1977 | Almond . | |
| 4,171,120 | * 10/1979 | Clark | 254/1 |
| 4,324,384 | 4/1982 | Elser . | |
| 4,336,921 | * 6/1982 | Wienhold | 254/1 |
| 4,427,178 | * 1/1984 | Kozlowski | 254/1 |
| 4,572,531 | * 2/1986 | Elia | 280/62 |
| 4,690,605 | 9/1987 | Coccaro . | |
| 5,012,879 | 5/1991 | Bienek et al. . | |
| 5,232,203 | 8/1993 | Butts . | |
| 5,335,923 | * 8/1994 | Langenback et al. | 254/134 |
| 5,340,082 | 8/1994 | Holloway . | |
| 5,419,534 | 5/1995 | Vesely . | |
| 5,655,734 | 8/1997 | Dahl . | |
| 5,678,804 | 10/1997 | Lintelman et al. . | |
| 5,713,557 | 2/1998 | Kang . | |
| 5,716,061 | 2/1998 | Sloan et al. . | |
| 5,826,857 | 10/1998 | Brack et al. . | |
| 5,893,571 | 4/1999 | Nowell . | |

* cited by examiner

Primary Examiner—Robert C. Watson
(74) Attorney, Agent, or Firm—Patent Law Offices of Rick Martin, P.C.

(57) ABSTRACT

A standard car jack's front wheels are supported by a carriage having a cradle to secure the front wheels therein. The carriage has a caster-type wheel at each end. The carriage has a leg extending rearward and having a third caster-type wheel mounted on it to create a triangular support platform for the jack. The jack's rear caster-type wheels remain on the ground. A lifting brace fits onto the pedestal of the jack. An all terrain vehicle (ATV) can be lifted and rotated by one person, thereby facilitating the parking of several ATV's sideways in the bed of a pickup or on a trailer.

17 Claims, 4 Drawing Sheets

JACK DOLLY

FIELD OF INVENTION

The present invention relates to providing a standard automobile jack with a dolly having a plurality of wheels each of which is rotatable around its central axis. Thus, an automobile jack becomes movable with far less effort.

BACKGROUND OF THE INVENTION

The standard automobile floor jack has a rectangular frame supporting a front axle. The axle supports a pair of wheels which provide a range of rolling motion on the forward and rearward directions. The rear of the frame has a left and a right brace each of which supports a caster type wheel to provide a range of motion of 360° for the rear of the frame. However, if the front of the frame needs to be moved sidewards, then the front wheels must be slid sidewards. Such a sidewards motion requires overcoming the static friction of the wheels against the ground surface. The existence of a grate or a gravel or a rough surface would prohibit the sidewards motion of the front end of the frame. The user would have to push the front end sidewards if he could. But if the front end was located under the automobile, then pushing sidewards on the front end could be impossible. The user could try to jerk the entire frame back and forth to reach the desired location for the front end. If a user wishes to load multiple all terrain vehicles sideways in the bed of a pickup, then sliding the front wheels of the floor jack dolly is necessary. A better solution is needed.

The present invention provides a simple chassis for the front end of the jack to rest on. The chassis has a pair of caster type wheels as well as a rear leg which has a caster type wheel. The user can hold the jack handle and easily move the front of the jack in a 360° range of motion using the chassis caster type wheels. A special brace can support an all terrain vehicle. Thus, rotating an all terrain vehicle in the bed of a pickup can be done by one person.

SUMMARY OF THE INVENTION

The main aspect of the present invention is to provide a chassis to hold up the front end of a jack so as to allow a 360° range of motion for the front end of the jack via the use of caster wheels on the chassis.

Another aspect of the present invention is to provide a brace to support an all terrain vehicle.

A rectangular chassis has a dugout running lengthwise to hold the front end of an automobile jack. The jack's front wheels sit in the dugout, wherein ridges of the dugout secure the jack wheels in place. A rearward projecting leg has a rod to secure the body of the jack. The end of the leg as well as each end of the rectangular chassis has a caster type wheel. The rectangular chassis carrying the front end of the jack can be easily moved in a 360° range of motion. A pair of braces set at a 90° angle provide a support brace for an all terrain vehicle.

Other aspects of this invention will appear from the following description and appended claims, reference being made to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 4:
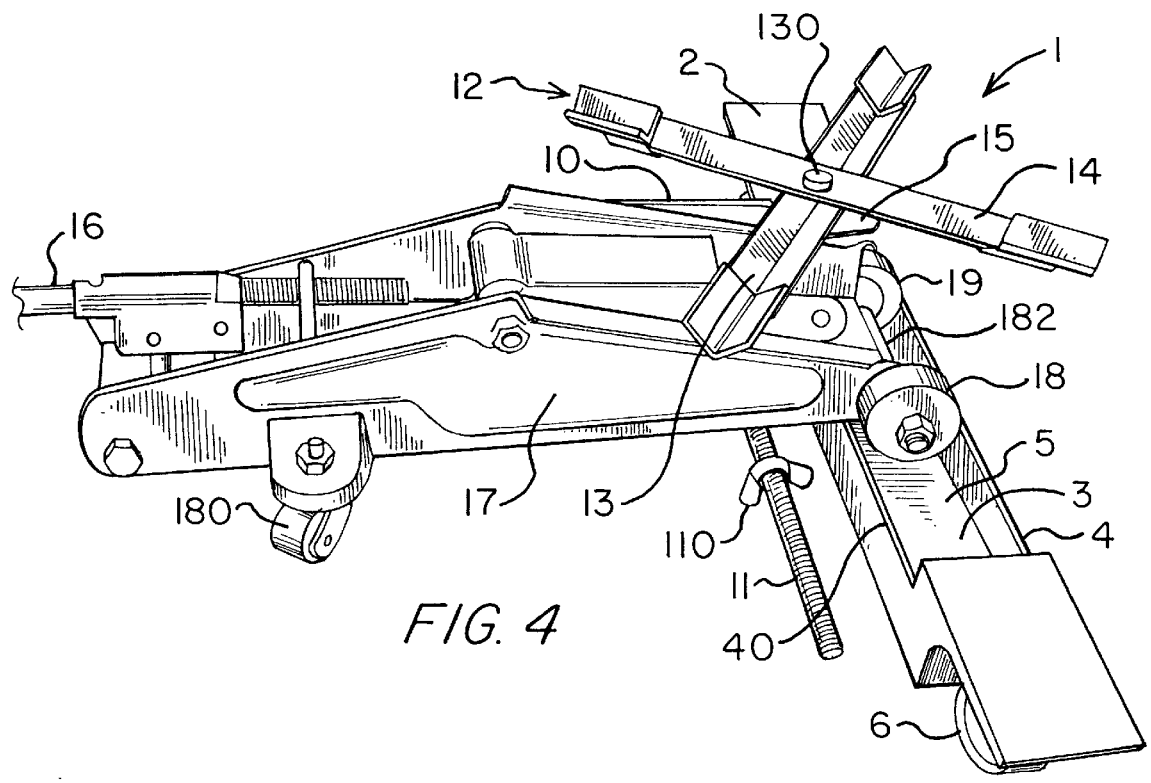
FIG. 4 is a rear perspective of the jack dolly view showing the detail of the locking rod and handle searing the jack.

Referring first to FIG. 4 a jack dolly 1 comprises a carriage 2 having a cradle 3. The cradle 3 has a front wall 4, a bottom 5 and a back wall 40 in order to support the front of a standard jack 17. The jack's front wheels 18,19 sit in the cradle 3. Wheels 18,19 are mounted on a fixed axle 182 so they do not pivot. Rear wheels 180,181 are caster type wheels that pivot. A handle 16 raises the pedestal 15 in a known manner. The jack 17 is held normal to the cradle 3 by means of a leg 10, a rod 11 attached to leg 10 by any known means and a threaded lock handle 110. The carriage 2 has caster type wheels 6,7. The leg 10 has a caster type rear wheel 120. A lifting brace 12 has four radially extending arms, which are made from two sections 13,14. Each arm has a V shaped contour to grab the underside of a small vehicle such as an all terrain vehicle (ATV). The center post 130 of the lifting brace 12 fits into a hole in the pedestal 15.

Figure 1:
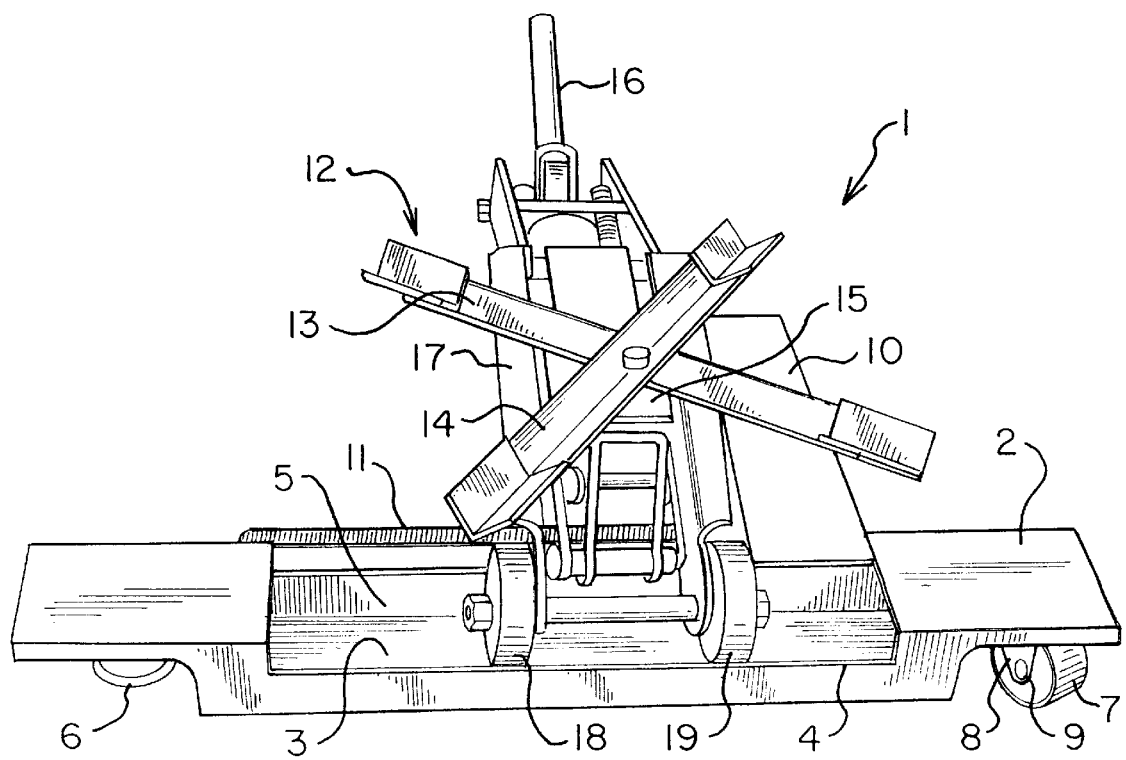
FIG. 1 is a front perspective view of the preferred embodiment of the jack dolly holding a jack.

Referring next to FIG. 1 the caster type wheels 6,7 allow the user to manipulate the handle 16 to slide the jack dolly 1 easily in a 360° rotation. The 360° rotation is facilitated by jack dolly front wheels 6,7, jack dolly rear wheel 12 and jack rear wheels 180,181.

Figure 2:
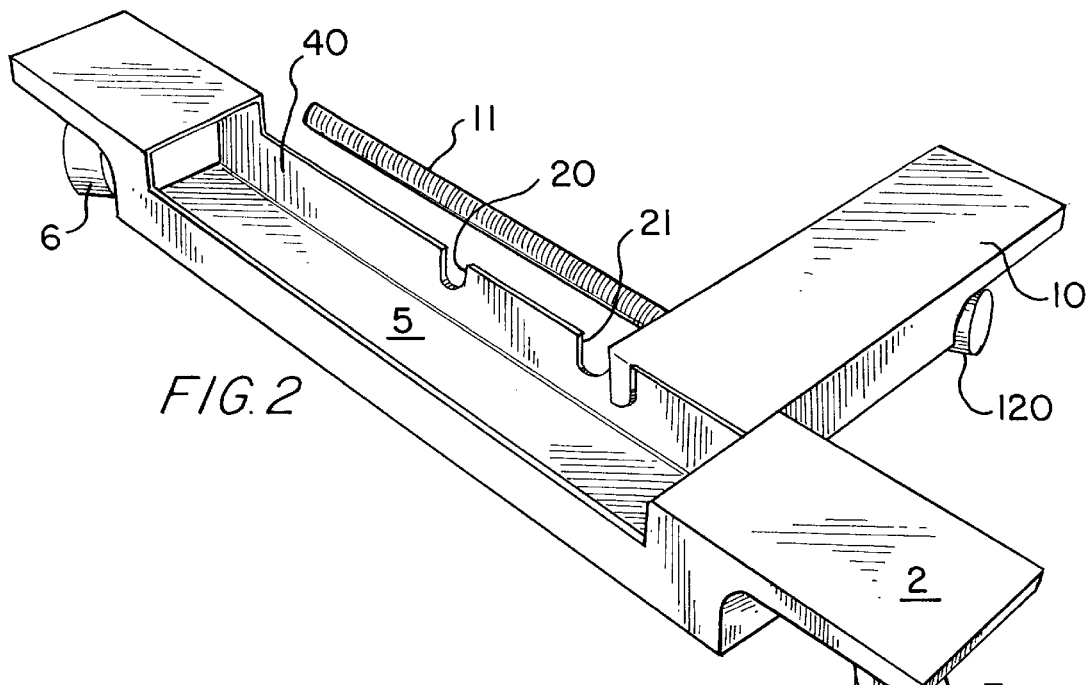
FIG. 2 is a top perspective view of the preferred embodiment empty.

Referring next to FIG. 2 the back wall 40 is seen to have mounting cutouts 20,21 which support the sides of the jack 17. In the alternative the back wall 40 can have a lower upper ledge lengthwise to accommodate all types of jacks.

Figure 3:
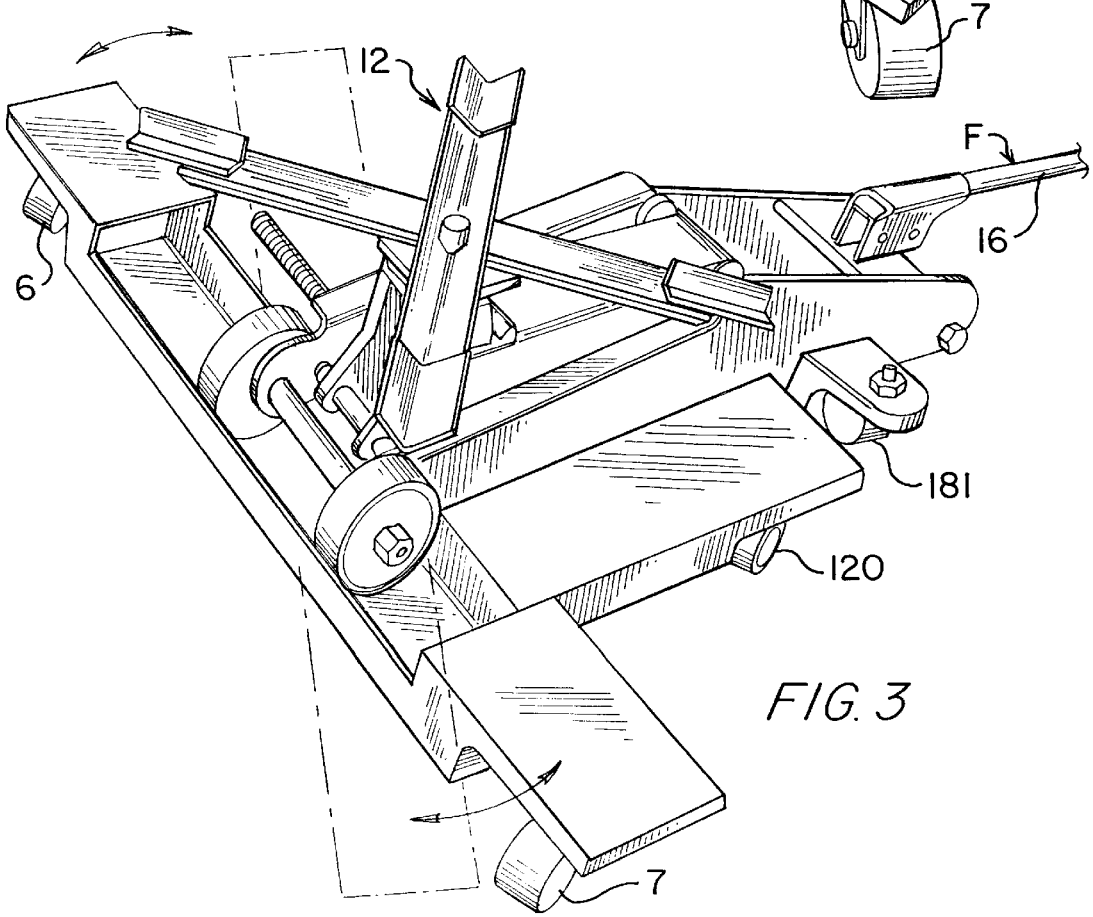
FIG. 3 is a top perspective view of the preferred embodiment being rotated in a 360° range of motion.

Referring next to FIG. 3 the user's force F on handle 16 easily pivots the jack dolly and jack in a 360° pivot as shown by the dotted lines.

Figure 5:
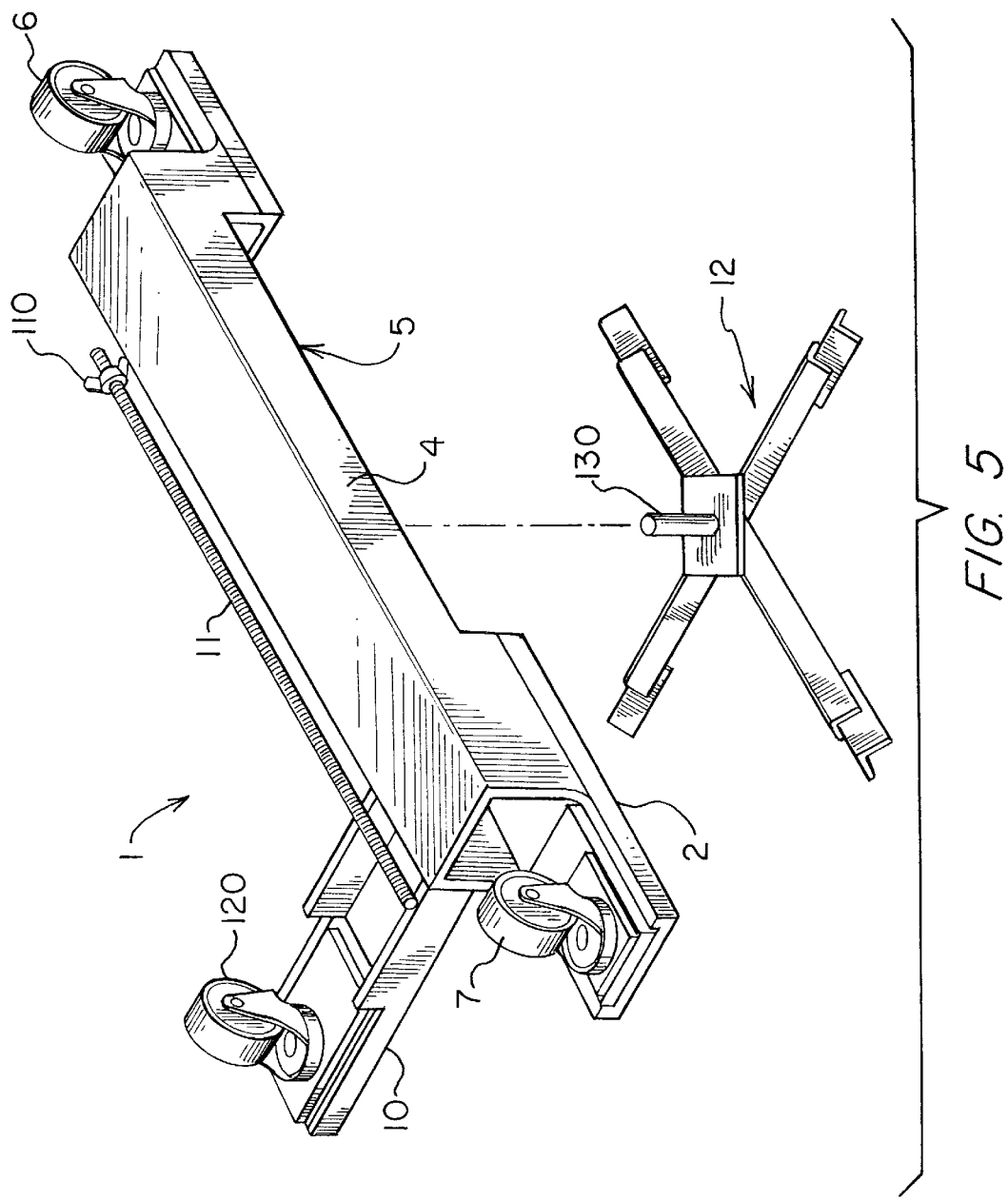
FIG. 5 is a bottom perspective view of the preferred embodiment.

Referring next to FIG. 5 the jack dolly 1 is shown inverted in an exploded view.

Figure 6:
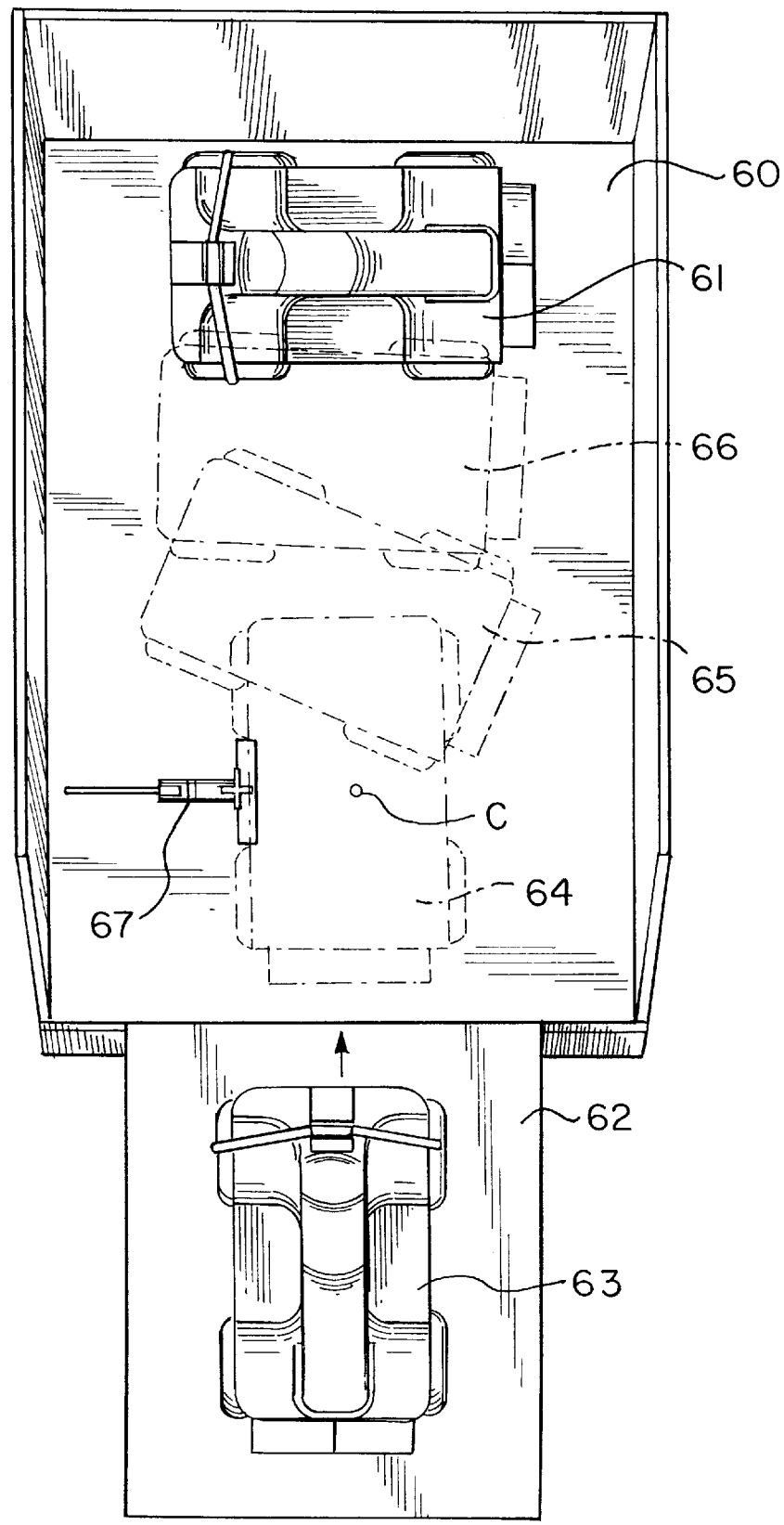
FIG. 6 is a top perspective view of a truck being loaded with ATV's using the jack dolly.

Referring next to FIG. 6 a bed 60 of a pickup is shown having a ramp 62. An ATV 61 has been rotated and parked sideways and forward in the bed 60. The dotted outlines of the second ATV 63 are shown as 64,65,66 as the jack/jack dolly combination 67 lifts the ATV at its canter C, rotates it 90° and rolls it forward, all with one operator.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A jack dolly comprising:
   a carriage suited to support and secure a front end of an automotive floor jack;
   a leg extending from the carriage; and
   said leg and said carriage each having a caster type wheel, thereby facilitating a 360° rotation.

2. The jack dolly of claim 1, wherein the carriage further comprises a cradle to hold a pair of front wheels of the jack.

3. The jack dolly of claim 1, wherein the leg further comprises a 90° orientation rearward from the carriage.

4. The jack dolly of claim 3, wherein the caster-type wheel(s) is mounted one each at opposing ends of the carriage and a rear end of the leg.

5. The jack dolly of claim 3, wherein the leg further comprises a rod and lock handle extending therefrom.

6. The jack dolly of claim 2, wherein the cradle further comprises a rear wall having cutouts for the jack.

7. The jack dolly of claim 1 further comprising an automotive floor jack and a lifting brace secured to a pedestal of the jack.

8. The jack dolly of claim 7, wherein the lifting brace further comprises a pair of intersecting arms.

9. A jack dolly comprising:

a platform having at least three caster-type wheels; and said platform having a cradle to house and secure a front end of an automotive floor jack, thereby allowing a rear end of the automotive floor jack to remain in contact with a support surface.

10. The dolly of claim 9, wherein the platform further comprises a carriage having a caster-type wheel at each end thereof, and a leg extending from the carriage and having a caster-type wheel at a distal end from the carriage.

11. The dolly of claim 9 further comprising an automotive floor jack and a lifting brace secured to a pedestal of the automotive floor jack.

12. The dolly of claim 10, wherein the leg further comprises a rod having a locking handle to further support the jack.

13. In combination with an automotive floor jack an improvement comprising:

a support platform for a front end of the automotive floor jack; and said support platform having at least three pivotable support wheels, thereby facilitating a 360° rotation of the jack.

14. The improvement of claim 13, wherein the platform further comprises a cradle and a strut extending therefrom, said strut having a distal pivotable support wheel.

15. The improvement of claim 13 further comprising a lifting brace for the jack.

16. The improvement of claim 13 further comprising a lifting brace inserted into a pedestal of the automotive floor jack.

17. The improvement of claim 16, wherein the lifting brace further comprises a pair of intersecting arms.

* * * * *